United States Patent [19]

Lemkin

[11] Patent Number: 4,722,481
[45] Date of Patent: Feb. 2, 1988

[54] ADJUSTABLE DRIP EMITTER

[76] Inventor: Jack Lemkin, 5900 Mohican La., Cincinnati, Ohio 45243

[21] Appl. No.: 859,817

[22] Filed: May 5, 1986

[51] Int. Cl.$^4$ .............................................. A01G 25/00
[52] U.S. Cl. .................................... 239/542; 239/539; 239/581.2; 137/513.5
[58] Field of Search ........ 239/271, 485, 489, 537–539, 239/542, 547, 581.2, 590.5; 251/117; 137/513.5

[56] References Cited

U.S. PATENT DOCUMENTS

| 2,709,623 | 5/1955 | Glynn . | |
|---|---|---|---|
| 2,752,801 | 7/1956 | Olson . | |
| 3,586,239 | 6/1971 | Blass | 239/542 X |
| 3,727,635 | 4/1973 | Todd | 137/513.5 |
| 3,729,142 | 4/1973 | Rangel-Garza et al. | 239/542 X |
| 3,792,588 | 2/1974 | Gilaad . | |
| 3,815,831 | 6/1974 | Jooste | 239/542 X |
| 3,833,176 | 9/1974 | Caldwell | 239/542 |
| 3,834,628 | 9/1974 | Selman | 239/542 |
| 3,840,209 | 10/1974 | James | 239/542 X |
| 3,885,713 | 5/1975 | Weitzel et al. . | |
| 3,891,150 | 6/1975 | Hoff et al. | 239/271 |
| 3,926,375 | 12/1975 | Reeder et al. | 239/542 |
| 3,973,732 | 8/1976 | Diggs | 239/271 |
| 3,979,070 | 9/1976 | Lemelshtrich | 239/542 |
| 3,998,391 | 12/1976 | Lemelshtrich | 239/542 |
| 4,060,200 | 11/1977 | Mehoudar | 239/542 |
| 4,084,749 | 4/1978 | Drori | 239/271 |
| 4,105,162 | 8/1978 | Drori | 239/542 X |
| 4,127,146 | 11/1978 | Self . | |
| 4,209,133 | 6/1980 | Mehoudar | 239/542 |
| 4,256,262 | 3/1981 | Rosenberg et al. | 239/276 |
| 4,281,798 | 8/1981 | Lemelstrich | 239/542 |
| 4,331,293 | 5/1982 | Rangel-Garza | 239/542 |
| 4,366,926 | 1/1983 | Mehoudar | 239/542 |
| 4,614,303 | 9/1986 | Moseley, Jr. et al. | 239/590.5 X |

FOREIGN PATENT DOCUMENTS 2043417 10/1980 United Kingdom ................ 239/542

OTHER PUBLICATIONS

Netafim Irrigation Equipment & Drip Systems of Israel (undated advertisement).
Lego, M. Lemelshtrich Ltd. of Netania, Israel (undated advertisement).
Agrifim Irrigation Inc. of Fresno. California (undated advertisement).
RIS Irrigation Systems of El Cajon, California (undated advertisement).

Primary Examiner—Andres Kashnikow
Assistant Examiner—Mary Beth O. Jones
Attorney, Agent, or Firm—Martin P. Hoffman; Mitchell B. Wasson; Charles W. Fallow

[57] ABSTRACT

Several embodiments of drip emitters are disclosed. These embodiments comprise (1) a molded plastic, body with an upwardly opening housing, and (2) a molded plastic plug including an enlarged head, a depending shank, and a helical thread defined about the perimeter of the shank. The body is executed in a relatively soft plastic, while the plug is executed in a harder plastic. The shank of the plug is press-fitted into the housing, and the threads on the shank of the plug cut into the softer plastic of the housing. By advancing or retracting the plug, the length of the helical flow path is altered and the rate of discharge of droplets from the emitter is changed to account for changes in line pressure, accumulation of debris in the emitter, and other operational parameters.

8 Claims, 9 Drawing Figures

ADJUSTABLE DRIP EMITTER

BACKGROUND

The present invention relates generally to drip emitters which dispense small quantities of water directly to the plants or cultures to be irrigated. Several emitters may be utilized in-line within a water distribution system, and each emitter functions to dispense water droplets in a steady, slow trickle at a selected location within the system.

DESCRIPTION OF PRIOR ART

Diverse drip emitters have been developed, and utilized commercially. One variety of drip emitter that has gained wide-spread commercial acceptance employs a labyrinth-like flow path situated in the body of the emitter. The labyrinth-like flow path winds and bends in order to retard the water flow through the emitter body. The tortuous flow path significantly reduces the water pressure before discharging the water, in droplets, at the outlet of the dripper. Representative drip emitters employing labyrinth paths to reduce line pressure to a trickle-like discharge are shown in U.S. Pat. No. 3,791,587, granted Feb. 12, 1974 to Mordeki Drori; U.S. Pat. No. 3,979,070, granted Sept. 7, 1976 to Moshe Lemelshtrich; and U.S. Pat. No. 4,060,200, granted Nov. 29, 1977 to Raphael Mehoudar.

SUMMARY OF THE INVENTION

The present invention is an adjustable, drip emitter that functions satisfactorily over a range of line pressures. The present invention employs a simplified design that minimizes the need for precision molded parts, such as those members that define a labyrinth-like path in known drip emitters.

The preferred embodiment of the invention is characterized by a (1) rigid plastic plug with a helical thread defined on its shank, and (2) a resilient plastic body with an upstanding housing that accepts the shank of the plug therewithin. The external diameter of the shank is judiciously chosen to be slightly larger than the interior diameter of the upstanding housing so that the plug is press-fit or screwed into the housing. A helical flow path is defined between the shank of the plug and the interior of the upstanding housing.

In all embodiments, the screw can be advanced a variable distance into the body of the plug to alter the length of the helical path defined therebetween, thus changing the discharge rate for the drip emitter, as needed. The discharge rate may need alteration to compensate for changes in line pressure, to overcome frictional losses within the emitter as debris accumulates therein during extended use, etc.

OBJECTS OF THE INVENTION

The major objective of the present invention is to provide a drip emitter that is inexpensive to fabricate, so that the drip emitter can be sold at an economically competitive price. Since a water distribution system may utilize numerous drip emitters, with one or more dedicated to each plant, a savings of even a fraction of a cent may be meaningful. The present drip emitter utilizes only two molded plastic components, namely a plug and a body to receive the plug. The molding of intricate flow paths, as in conventional drip emitters using a labyrinth-like path, is obviated.

Another significant objective of the present invention is to realize a drip emitter that is adjustable. Since the threads on the shank of the plug assist in defining a helical flow path within the emitter, the length of the helical path can be manually altered by advancing, or retracting, the plug. Thus, the present drip emitter can perform satisfactorily over a range of line pressures, and can be readily adjusted, even after in-line installation, to meet changing performance criteria.

A further objective of the present invention is to produce a drip emitter that can be completely shut off. Yet another objective is to achieve a drip emitter that can easily be inserted into a water distribution system, and will not introduce significant frictional losses into the system. Furthermore, particularly in arid or semi-arid regions where water costs are high, the drip emitter functions satisfactorily and effectively.

Also, an objective of the present invention is to realize a drip emitter wherein a predetermined minimum flow rate through the emitter is achieved at all times and under all flow conditions.

Yet other advantages realized by the present drip emitters will become readily apparent to the artisan when the following drawings are construed in harmony with the ensuing detailed description of the invention.

DESCRIPTION OF THE PREFERRED EMBODIMENT

Figure 1:
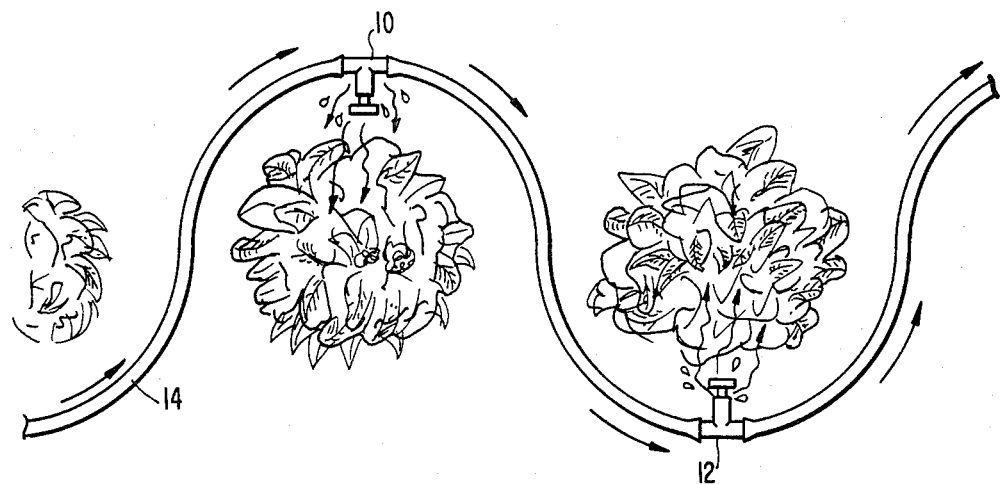
FIG. 1 depicts a water distribution system, with the present drip emitters installed therein, for delivering water directly to plants.

Turning now to the drawings, FIG. 1 depicts drip emitters 10,12 that are joined, in-line, to conduit 14. The conduit is secured to a pressurized water source (not shown) and is extended in such a fashion that drip emitters 10,12 deliver water directly to the plants to be irrigated. The drip emitters can be used with equal facility for numerous purposes, such as for watering garden plants, vegetable gardens and the like, or for watering citrus groves, fruit orchards, etc.

Figure 2:
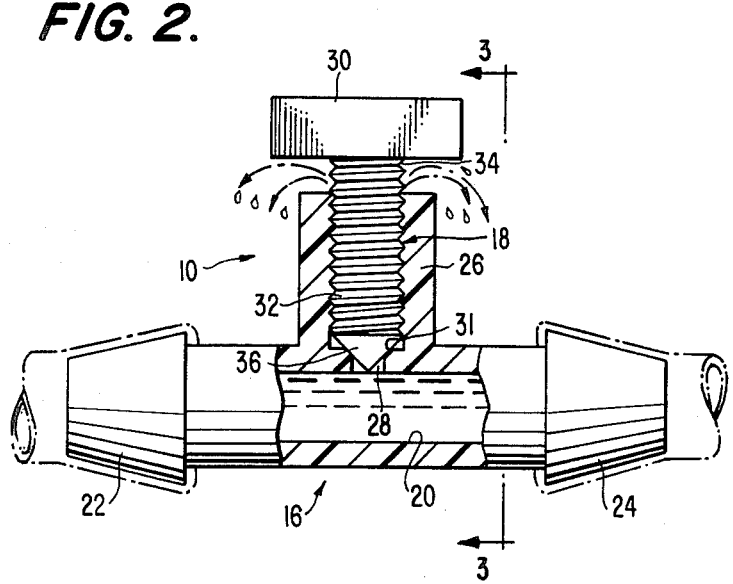
FIG. 2 is a front elevational view of a preferred embodiment of a drip emitter constructed in accordance with the principles of this invention.
Figure 3:
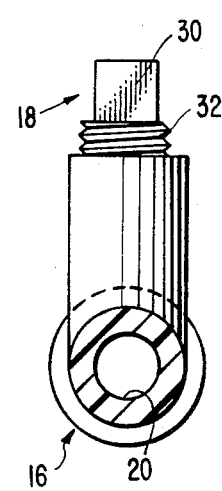
FIG. 3 is a side elevational view of the drip emitter, such view being taken along line 3—3 in FIG. 2 and in the direction indicated.

FIGS. 2-3 illustrate the preferred embodiment of a drip emitter 10 embodying the principles of the present invention. Drip emitter 10 comprises an inverted T-shaped body 16 and a plug 18. Body 16 is a molded plastic member including a hollow bore 20 with a tapered nipple 22 at one end, and an oppositely tapered nipple 24 at the opposite end. A cylindrical housing 26 projects vertically above bore 20, and an aperture 28 allows communication between bore 20 and housing 26. A tapered seat 30 is formed at the upper end of aperture 28.

The emitter 10 is utilized in-line; thus, conduit 14 is severed, and one end thereof is inserted onto nipple 24. The opposite end is inserted onto nipple 22. The nipples are enlarged sufficiently to expand the conduit and retain same in fixed position and secured to the drip emitter. The conduit is shown in phantom outline in FIG. 2.

Plug 18 includes an enlarged head 30, a depending shank 32 with sharp, well defined threads 34 extending helically about its perimeter, and a tapered conical base 36. The external diameter of the shank 32 is chosen to be slightly larger than the interior diameter of housing 26. Consequently, when plug 18 is advanced axially into the housing 26, the shank 32 is press-fitted into housing 26. The threads 34 contact the softer plastic housing and define a helical path between the exterior of the shank and the interior of the housing 26. The plug can be advanced, or retracted, relative to the housing to alter the length of the helical flow path for the water passing through the dripper emitter. As suggested in FIG. 2, water droplets are discharged at the upper end of the housing. Since the plug 18 is not permanently secured to the body 16, the length of the helical path, and thus the rate of discharge of the droplets, can be adjusted to compensate for pressure variations in the source for pressurized water, or for frictional losses in the conduit as the water flows through several drip emitters connected serially and in-line, or for debris, scale accumulations, etc.

The drip emitter 10 can be shut off simply by advancing the plug 18 into the housing 26 so that base 36 engages seat 30. Then, the water in conduit 14 will pass unimpeded through the bore 20 in the body 16. The tip of base 36 is spaced above the water flow through bore 20 for unimpeded flow.

Figure 4:
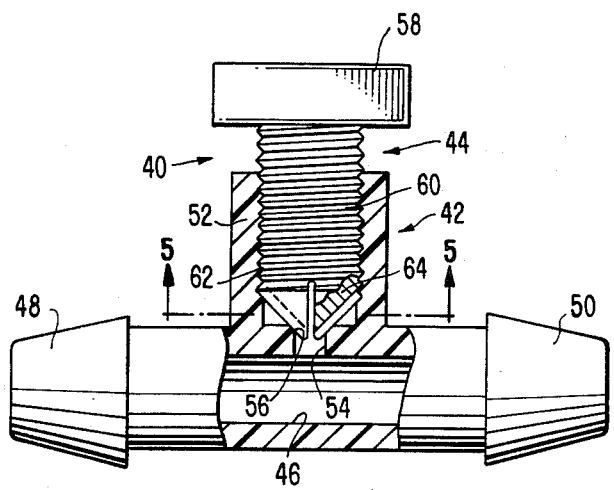
FIG. 4 is a front elevational view of a second, or alternative embodiment, of a drip emitter constructed in accordance with the principles of this invention.
Figure 5:
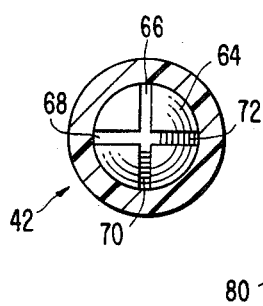
FIG. 5 is a horizontal cross-section view of the drip emitter of FIG. 4, such view being taken along line 5—5 in FIG. 4 and in the direction indicated.

FIGS. 4–5 illustrate a second, or alternative embodiment, of a drip emitter 40 embodying the principles of the present invention. Drip emitter 40 comprises an inverted T-shaped body 42 and a plug 44. Body 42 is a molded plastic member including a hollow bore 46 with a tapered nipple 48 at one end, and an oppositely tapered nipple 50 at the opposite end. A cylindrical housing 52 projects vertically above bore 46, and an aperture 54 allows communication between bore 46 and housing 52. A tapered seat 56 is formed at the upper end of aperture 54.

Plug 44 includes an enlarged head 58, a depending shank 60 with sharp, well-defined threads 62 extending helically about its perimeter, and a tapered conical base 64. A series of slots 66, 68, 70 and 72 extend upwardly and outwardly from the tip of base 64. The slots are spaced 90° apart, but the number and orientation of the slots can be varied, as necessary, for particular applications.

As the plug 44 is advanced axially into the housing 52, the sharp threads 62 on the harder plastic plug bite into the softer plastic body and define a helical path between the exterior of the shank 60 and the interior of the housing 52. The plug can be advanced, or retracted, relative to the housing to alter the length of the helical flow path, and thus the rate of discharge, for the water passing through the dripper emitter. However, even when the plug 44 is advanced so that base 64 engages seat 56, a limited amount of water flows through slots 66, 68, 70 and 72 and enters the helical flow path within housing 52. The slots, in effect, determine the minimum amount of water delivered by the drip emitter.

Figure 6:
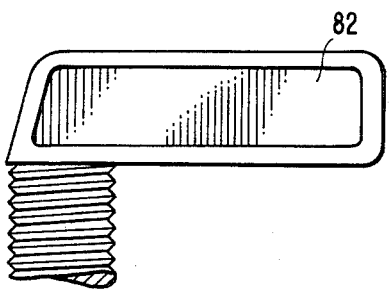
FIG. 6 is a fragmentary, front elevational view, on an enlarged scale, of a handle for a third embodiment of the plug for the present drip emitter.
Figure 7:
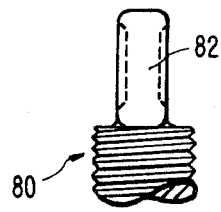
FIG. 7 is a side elevational view of the handle shown in FIG. 6.

FIGS. 6–7 show a third embodiment of the present invention wherein the plug 80 has an upper head 82. The remainder of the plug is similar to plugs 10 and 40.

Figure 8:
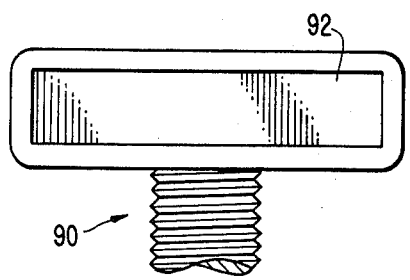
FIG. 8 is a fragmentary, front elevational view, on an enlarged scale, of a handle for a fourth embodiment of the plug for the present drip emitter.

FIGS. 8 show a fourth embodiment of the present invention wherein the plug 90 has an elongated head 92 that allows increased force to be applied to the plug to facilitate its cutting engagement with the body of the drip emitter.

Figure 9:
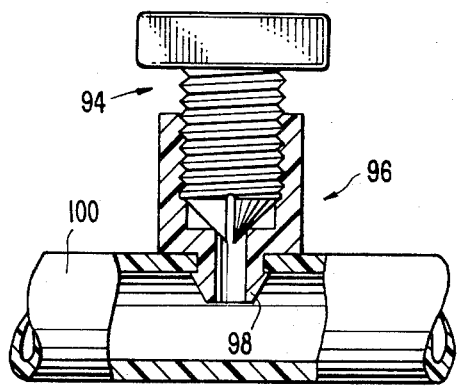
FIG. 9 is a side elevational view of yet another embodiment of the present drip emitter.

FIG. 9 shows a fifth embodiment of the invention wherein the thread on plug 94 bites into the interior wall of body 96 to define a helical flow path through the drip emitter. In contrast to the inverted T-shaped body of the dripper emitters 10 and 40, body 96 terminates in a barb 98 that is pressed through the wall of conduit 100.

Numerous other revisions, changes, and alterations to the dripper emitter will occur to the skilled artisan by virtue of the foregoing detailed description of the invention. For example, the bodies 16, 42 and 96 may be formed of high density polyethylene of polypropylene while the plugs 18 and 44 may be formed of a harder, more rigid plastic, such as CELCON, DELRIN, ABS, NYLON, or ACETAL or other commercially available plastics. Consequently, the appended claims should be broadly construed consistent with the spirit of the invention and should not be unduly restricted to their literal terms.

I claim:

1. A drip emitter comprising:
   (a) a molded plastic body including an upwardly opening housing,
   (b) means on said housing for securing a conduit in operative relationship thereto,
   (c) an aperture defined between said housing and the conduit to allow communication therebetween, said aperture having a tapered seat at its entrance,
   (d) a molded rigid plastic plug including a shank with threads distributed in a continuous, helical fashion about its perimeter and terminating in a tapered conical base at its lower end for engaging said tapered seat in order to restrict flow between the conduit and the housing in the body, said base including a plurality of slots formed therein, said slots extending upwardly and outwardly from the lower end of the base to allow limited flow past said tapered seat under all operating conditions,
   (e) said plug being advanced into said plastic housing so that said threads cooperate with the inner surface of said housing to define a flow path that will discharge droplets at the upper end of said housing when water is introduced into said drip emitter.

2. A drip emitter as recited in claim 1 wherein said shank on said plug is cylindrical, and said housing on said body is also cylindrical, the diameter of said shank being slightly more than the diameter of said housing, so that said shank can be press-fitted thereinto with the threads on the shank contacting the interior surface of said housing in such manner as to provide a helical flow path.

3. A drip emitter as recited in claim 1 wherein said shank on said plug is cylindrical and said housing on said body is also cylindrical, the diameter of said shank being slightly greater than the diameter of said housing, the threads on said shank biting into the interior of said housing to cut a flow path thereinto as the plug is advanced axially into the housing.

4. A drip emitter as recited in claim 1 wherein said plurality of slots consists of four slots spaced at 90° intervals about said conical base.

5. A drip emitter as recited in claim 1 wherein said means on said housing for securing a conduit consists of a first nipple, and a second therefrom.

6. A drip emitter as recited in claim 1 wherein said means on said housing for securing a conduit comprises a depending barb that can penetrate the conduit.

7. A method of forming a drip emitter comprising the steps of:
 (a) molding an integral member including a plastic body with an upwardly opening housing and an aperture for establishing communication between the drip emitter and a conduit operatively associated therewith,
 (b) molding a plug member with an enlarged head and a depending shank, said plug being executed in a plastic harder than the plastic employed for said plastic body, said plug further includes a tapered conical base having a plurality of slots formed therein, and said plastic body includes a tapered seat at the entrance to said aperture,
 (c) forming a continuous helical thread about the perimeter of the shank of said plug, and
 (d) advancing said plug into said upstanding housing so that said helical threads define a flow path in cooperation with the interior surface of said plastic housing,
 (e) adjusting said plug relative to said housing to alter the length of the flow path within said drip emitter to match other flow conditions.

8. The method as defined in claim 7 wherein the threads on said plug form partial threads in the interior surface of said housing to cut a helical flow path therein, so as to provide sufficient thread section to allow said plug to be adjusted axially and allow for water flow.

* * * * *